United States Patent
Kukura et al.

(10) Patent No.: US 6,453,320 B1
(45) Date of Patent: Sep. 17, 2002

(54) METHOD AND SYSTEM FOR PROVIDING OBJECT REFERENCES IN A DISTRIBUTED OBJECT ENVIRONMENT SUPPORTING OBJECT MIGRATION

(75) Inventors: Robert Allen Kukura, Natick; Julie Ann Salamone, Medford; Ronald Clarke Witham, Jr., Cambridge, all of MA (US)

(73) Assignee: IONA Technologies, Inc., Dublin (IL)

( * ) Notice: Subject to any disclaimer, the term of this patent is extended or adjusted under 35 U.S.C. 154(b) by 0 days.

(21) Appl. No.: 09/241,926

(22) Filed: Feb. 1, 1999

(51) Int. Cl.[7] .............................................. G06F 17/30
(52) U.S. Cl. ........................................ 707/103; 707/10
(58) Field of Search ................... 707/10, 103; 709/203, 709/201

(56) References Cited

U.S. PATENT DOCUMENTS

| | | | |
|---|---|---|---|
| 4,905,138 A | 2/1990 | Bourne | 717/139 |
| 4,994,998 A | 2/1991 | Anezaki | 704/1 |
| 5,210,535 A | 5/1993 | Fujita | 709/228 |
| 5,263,137 A | 11/1993 | Anezaki | 709/246 |
| 5,291,583 A | 3/1994 | Bapat | 717/137 |
| 5,317,742 A | 5/1994 | Bapat | 707/3 |
| 5,367,635 A | 11/1994 | Bauer et al. | 709/221 |
| 5,418,963 A | 5/1995 | Anezaki et al. | 717/117 |
| 5,452,433 A | 9/1995 | Nihart et al. | 709/223 |
| 5,519,868 A | 5/1996 | Allen et al. | 717/169 |
| 5,539,909 A | 7/1996 | Tanaka | 709/315 |
| 5,602,993 A | 2/1997 | Stromberg | 717/173 |
| 5,613,100 A | 3/1997 | Anezaki | 710/65 |
| 5,632,035 A | 5/1997 | Goodwin | 717/126 |
| 5,642,511 A | 6/1997 | Chow et al. | 717/105 |
| 5,649,227 A | 7/1997 | Anezaki | 712/1 |
| 5,802,291 A | * 9/1998 | Balick et al. | 709/202 |
| 5,854,750 A | * 12/1998 | Phillips et al. | 707/103 |
| 5,864,866 A | * 1/1999 | Henckel et al. | 707/103 |
| 5,983,233 A | * 11/1999 | Pontonniee | 707/103 |
| 6,044,244 A | * 3/2000 | Radia et al. | 395/710 |
| 6,134,559 A | * 10/2000 | Brumme et al. | 707/103 |

OTHER PUBLICATIONS

Hands et al., An Inclusive and Extensible Architecture for Electronic Brokerage, IEEE online, pp. 1–10, Jan. 1999.*

Translation of GDMO/ASN.1 Specification into COR-BA–IDL, Jul. 14, 1994, 97 pages.

(List continued on next page.)

*Primary Examiner*—Greta L. Robinson
(74) *Attorney, Agent, or Firm*—Pennie & Edmonds LLP

(57) ABSTRACT

A prototype object reference for use in a distributed object computing environment is described. The object reference includes a specified object reference portion and an unspecified object reference portion. The prototype object reference is transformed into a valid object reference by insertion of specification information into the unspecified object reference portion. An indirect object reference for use in a distributed object computing environment comprising is also described, comprising a persistent object reference portion for communicating with a location service; and an object key; wherein a direct object reference is generated from the indirect object reference by insertion of the object key into a prototype direct object reference comprising transient information sufficient to communicate with the current location of an object reference[0084] by the object key. A location service for generating a direct object reference based on an indirect object reference and a prototype object reference is also described.

4 Claims, 15 Drawing Sheets

Legend:
IMR: Implementation Repository
(A) Endpoint Activator

OTHER PUBLICATIONS

Common Facilities Architecture; 11/95.

wysiwyg://90/http:www.omg.com/corba/whatiscorba.html, What is CORBA?, Jun. 17, 1999.

http://pent21.infosys.tuwien.ac.at/Research/Corba/OMG/arch2.htm, CORBA Overview, Jun. 17, 1999.

http://www7.nortelnetworks.com/corba/index.html, Nortel Networks: RCP–ORB—What is CORBA?, Jun. 17, 1999.

file:///C|/WINDOWS/DESKTOP/overview.html, Nortel Networks: RCP–ORB—Product Overview, Jun. 17, 1999.

wysiwyg://111/http/www.omg.com/corba/freestuff.html, Welcome to the CORBA Showroom!, Jun. 17, 1999.

http://www.dstc.edu.au/AU/staff/andreas–vogel/wiley–web/sample.html, Java Programming With CORBA by Andreas Vogel and Keith Duddy, Jun. 17, 1999.

http://omg.com/news/corbasec.html, TECS: Papers: A Quick Tour Of the CORBA Security Service, Jun. 17, 1999.

wysiwyg://151/file:/C|/WINDOWS/DESKTOP/tom-book.html, The Essential CORBA . . . How to order . . . , Jun. 17, 1999.

wysiwyg://162/file:/C|/WINDOWS/DESKTOP/oma.html, OMA Executive Overview, Jun. 17, 1999.

file:///C|/WINDOWS/DESKTOP/tutorial.html, Tutorial on Distributed Objects, Jun. 17, 1999.

file:///C|/WINDOWS/DESKTOP/corba–overview.html, Overview of CORBA, Jun. 17, 1999.

* cited by examiner

| ATTRIBUTE | DESCRIPTION | ACCESS | R/O | DEFAULT |
|---|---|---|---|---|
| process activator name | Name to identify a specific process activator running on a particular host within a location domain. This name is unique among all process activator names and is used to access information relating to this process activator. | RDONLY | R | N/A |
| Callback IOR | A transient IOR used to start processes via this process activator. | RDONLY | R | N/A |
| Security Information | Authorization and authentication information. | RDWR | R | N/A |

Figure 6 - IMR dynamic process activation table entry

| ATTRIBUTE | DESCRIPTION | ACCESS | R/O | DEFAULT |
|---|---|---|---|---|
| target process name | Name to identify a specific target process running on a particular host within a location domain. This name is unique among all target process names and is used for all management operations for this target process invocation. | RDWR | R | N/A |
| start-up flags | Describes when the target process is to be started. A table of valid values is described on the next page. | RDWR | R | on demand |
| process activator specification list | Describes a list of "process activator specifications" for starting the target. This option is used for transparent starting or restarting if the start-up options are either "always" or on demand". This location plug-in will select activators from the list until a target process activation criterion (such as "running") is satisfied. | RDWR | O | N/A |
| Security | Authorization and authentication information. | | | |

Figure 7 - IMR static process information table entry

| VALID VALUES | DESCRIPTION |
|---|---|
| disable start | The target process will not be restarted. Refer to Future Extensions Section. The target process may still be running and listening for requests. This could be the result of migrating a target process to another host where existing clients use this target process but new clients will communicate with a new version of the target process. |
| always | The target process is required to be up and running at all times. At boot time, the activation plug-in requests a list of target processes to start from the location plug-in. |
| on demand | If a client request is made and the target process is not running, the location plug-in implicitly sends a request to the activation plug-in to start a target process. |

Figure 8 - Valid values for start-up flag of process table entry

| ATTRIBUTES | DESCRIPTION | ACCESS | R/O | DEFAULT |
|---|---|---|---|---|
| process activator name | Name of process activator to activate the process. | RDWR | R | N/A |
| path name | Full path name of the target process to exec. | RDWR | R | N/A |
| maximum number of retries | Maximum number of retries to start a failing target process. Used in conjunction with the retry interval to determine a rate-limit. | RDWR | R | 3 |
| retry interval | A specified time interval to restart a failing target process. | RDWR | R | 2 seconds |
| arguments | Target process arguments, if any. | RDWR | O | N/A |
| environment | Target process environment settings, if any. | RDWR | O | N/A |
| User | The real user ID of the target process. This is part of the runnable identity of the target process. It is the responsibility of the activation plug-in to ensure that this user ID is authenticated before running a target process as this user ID. | RDWR | R | nobody |
| group | The real group ID of the target process. This is part of the runnable identity of the target process. It is the responsibility of the activation plug-in to ensure that this group ID is authenticated before running a target process as this group ID. | RDWR | R | nobody |

Figure 9 - IMR activator specification list entry

| ATTRIBUTES | DESCRIPTION | ACCESS | R/O | DEFAULT |
|---|---|---|---|---|
| target process name | Name to identify a running target process. This name maps to an existing name in the IMR static process information table. | RDONLY | R | N/A |
| process activator | Name of process activator to activate the process. This name maps to a process activator name in the process activator table. | RDONLY | R | N/A |
| state | Current state of target process. A table of valid values is described below. | RDONLY | R | RUNNING |
| process callback | A transient IOR representing the target process for management purposes, such as changing priority or killing. | RDONLY | R | N/A |
| security | Security information relating to authorization and authorization to access, modify or delete this entry. | RDWR | R | |

Figure 10 - IMR dynamic process information table entry

| VALID VALUES | DESCRIPTION |
| --- | --- |
| STARTING | The location plug-in has sent a request to the activation plug-in to start a target process and may not be active yet. This will prevent multiple instances from being started if the location plug-in gets control during another client operation request. |
| RUNNING | The location plug-in has received the target process information that the target process was successfully started. When the location plug-in gets control during a client operation request and the target process state is "running", then the location plug-in never has to communicate with an activation plug-in. |

Figure 11 - Valid values of process state

| ATTRIBUTES | DESCRIPTION | ACCESS | R/O | DEFAULT |
|---|---|---|---|---|
| namespace node name | this is the unqualified POA name of a non-terminal node of a POA tree. | RDWR | R | N/A |
| namespace node | This is the full-qualified POA name (FQPN) of the node. | RDWR | R | N/A |
| Allow dynamic registration flag | If set to true, a request directed to a child of this namespace will cause the locator to create a new static entry for the POA if no static entry is found in the IMR. | RDWR | R | false |
| security | Authorization information | | | |

Figure 12 - IMR static namespace table entry

| ATTRIBUTES | DESCRIPTION | ACCESS | R/O | DEFAULT |
|---|---|---|---|---|
| POA node name | this is the unqualified POA name of a POA endpoint. | RDWR | R | N/A |
| POA node fully-qualified name | This is the full-qualified POA name (FQPN) of the POA endpoint. | RDWR | R | N/A |
| ORB name | Name of the ORB where the endpoint resides | RDWR | R | ART |
| Allow dynamic registration flag | If set to true, a request directed to a child of this POA will cause the locator to create a new static endpoint for the POA if no static entry is found in the IMR. | RDWR | R | false |
| heartbeat | Polls at specified time interval to determine if the endpoint is still active. Only one endpoint per target process need to be pinged to optimize pinging. The default value of zero indicate no pining. | RDWR | O | 0 |
| creation sequence number | Starts at zero and incremented at every reqactivation of the POA instance. | | | |
| Endpoint callback | A transient IOR representing the target endpoint for management purposes such as shutdown. | | | |
| Security | Authorization and authentication information. | | | |

Figure 13 - IMR Static POA endpoint table entry

| ATTRIBUTES | DESCRIPTION | ACCESS | R/O | DEFAULT |
|---|---|---|---|---|
| endpoint name | Name (e.g. FQPN) to identify a specific target endpoint instance. This name maps to an existing endpoint name in an IMR static POA information table entry. | | | |
| activation time stamp | The date and time in absolute time that this target endpoint was successfully activated. | RDONLY | R | N/A |
| prototype direct IOR | Prototype direct object reference to target endpoint | RDONLY | R | N/A |
| state | Describes the state of target endpoint. The table below describes the valid values. | RDONLY | R | ACTIVE |

Figure 14 - IMR Dynamic POA endpoint information table entry

| VALID VALUES | DESCRIPTION |
|---|---|
| LOCATING | The location plug-in has sent a request to the endpoint activator to locate endpoint. This will prevent multiple requests from being sent if the location plug-in gets control during another client operation request. |
| PRESENT | The location plug-in just generates a new direct IOR by using the prototype direct IOR of the target endpoint stored in this dynamic IR entry and the object ID from the object key in the client request. The location plug-in then replies back to the client ORB and never has to communicate with the target endpoint itself. |

Figure 15 - Valid values for POA endpoint state

| ATTRIBUTES | DESCRIPTION | ACCESS | R/O | DEFAULT |
|---|---|---|---|---|
| ORB name | Name of the ORB with which the endpoint activator is associated. | RDONLY | R | N/A |
| endpoint activator IOR | IOR for the endpoint activator associated with the ORB. This object is used by the location plug-in to create, activate, deactivate, and destroy POAs, and is created the first time a POA with an adapter activator is announced. | RDONLY | R | N/A |
| Security | Authorization and authentication information. | | | |

Figure 16 - IMR endpoint activator table entry

| ATTRIBUTES | DESCRIPTION | ACCESS | R/O | DEFAULT |
|---|---|---|---|---|
| ORB name | Name of an ORB associated with the process. | RDONLY | R | N/A |
| target process name | Name of the target process associated with the ORB. This corresponds to an entry in the IMR static process information table. | | | |
| Security | Authorization and authentication information. | | | |

Figure 17 - IMR ORB-to-process map table entry

METHOD AND SYSTEM FOR PROVIDING OBJECT REFERENCES IN A DISTRIBUTED OBJECT ENVIRONMENT SUPPORTING OBJECT MIGRATION

FIELD OF THE INVENTION

The field of the invention is distributed object technology; more specifically, the invention relates to managing the location, activation and invocation of objects in a distributed object environment including object request brokers.

BACKGROUND

The Common Object Request Broker Architecture (CORBA) of the Object Management Group (OMG) is a set of specifications defining a language-independent distributed object architecture including Object Request Brokers (ORBs) for transparently managing the details of making requests and receiving responses of remote objects. Details on CORBA, including the complete specification, may be had from the Object Management Group, 492 Old Connecticut Path, Framingham, MA 01701 (www.omg.org).

In order for CORBA object implementations to interact with CORBA ORBs, object adapters (OAs) are used. Object adapters provide a 'standardized interface for object implementations, but themselves communicate with, ORBs via vendor-specific interfaces. Object adapters are responsible for demultiplexing requests from remote clients and dispatching the requests to appropriate servant object implementations, activating and deactivating objects and generating object references among other functions.

ORB clients in the CORBA environment use Interoperable Object References (IORs) generated by servers to request operations on target objects. The CORBA specification describes a structural framework for CORBA IORs, comprising a set of profiles. Profiles may include a portion called the object key that may be included in client request messages to identify the target object of the request. The object key format is not specified by CORBA and may be opaque (not parsed or interpreted) to applications developers and to client side ORBs. Because they are used to locate and invoke objects in a distributed computing environment, implemented CORBA IOR profiles have conventionally included location information such as the computer host name or port number as well as an object identifier for locating and invoking the target object.

Shortcoming in earlier CORBA object adapter definitions led to the introduction of the Portable Object Adapter (POA) in CORBA 2.2. The Portable Object Adapter is described in Chapter 9 of the CORBA version 2.2 specification, and in a series of articles by Douglas C. Schmidt of Washington University and Steve Vinoski of IONA Technologies, Inc. appearing in SIGS C++ Report magazine beginning in October 1997, and in Advanced CORBA Programming with C++ by Michi Henning and Steve Vinoski (Addison Wesley Longman, 1999, ISBN 0-201-37927-9).

POAs may be either transient or persistent. Persistent objects in CORBA ((including objects implemented using persistent POAs) are objects whose lifetimes are independent of the lifetimes of any processes in which they are activated. Transient objects are objects whose lifetimes are constrained by the lifetimes of the processes in which they are created. In the context of a POA (and as used in this application), "persistence" refers principally to the a persistent object's persistence across multiple process activations. It does not necessarily imply persistent state (as, for example, objects in an object database have persistent state) and persistent POAs need not have persistent state.

Conventional CORBA systems use IORs that are not well suited to use with persistent CORBA objects that outlive the processes in which they are activated, or objects that may require changes to services provided or used to access them during their lifetimes, because such changes have typically required changes to the IORs for those objects. Clients holding such an IOR will find the reference invalid, or inefficient to use because additional services are required for invocations with the IOR. Conversely, the existence of such IORs limits the administrative flexibility of the system because trade-offs must be made between desired administrative actions and the risks posed by compromising existing IORs. Additional administrative burdens are imposed by the substantial configuration and address allocation requirements of conventional CORBA systems.

The present invention overcomes these and other limitations of conventional CORBA systems.

SUMMARY

Object migration is facilitated by a location service. References to objects are exported that contain the information needed to communicate with the locator rather than directly with the server in which they are implemented. The location service is configured to always listen for requests at the same set of addresses, which are advertised in these references. Servers then can listen for requests at addresses that are dynamically assigned each time a server program is executed, eliminating the need to administratively configure fixed addresses for each server, and allowing the server to migrate between hosts. When a server is executed, it sends its current address to the locator. When clients attempt to communicate with the object, they use the information in the exported reference to establish communications with the locator. The locator then returns the current server address to the client (referred to as location forwarding), enabling the client to communicate directly with the server.

In one aspect of the present invention, the location service is preferably provided by exchanging object references between the server and the locator. The server constructs a prototype object reference, referred to as a prototype direct IOR, that includes the information needed by a client to communicate directly with tha[009f] server. The locator similarly constructs a prototype object reference, referred to as a prototype:indirect IOR, with the information needed to communicate directly with a location agent.

These prototype references are exchanged between the server and the locator. The server exports the objects it implements using object references constructed by inserting those objects identities into the prototype reference received from the locator. When the client sends a request to the locator, the locator extracts the target object's identity from the request, and inserts that identity into the prototype reference obtained from the server, and returns the resulting reference to the client.

The server and the location service may use different sets of plug-in transports and other services for communicating with client ORBs. For example, client ORBs communicating with the server using direct IORs may use plug-in transports or other services which need not be available to the location service. Similarly, client ORBs communicating with the location service may use plug-in transports or other services which need not be available to the server, and may use different security or quality of service Information.

In another aspect of the invention, scalability to large numbers of objects is preferably enhanced by maintaining location information for groups of objects, referred to as "endpoints", rather than for individual objects. An object's identity is split into two portions: an endpoint identity and an object identity relative to that endpoint. In a preferred implementation, the locator maintains current location information for each endpoint by exchanging prototype references with the server for each endpoint. When the locator receives a request for a target object, it maps the endpoint identity portion of the object's identity to the information needed to generate the object reference to return to the client, and inserts the object identity that was receive from the client.

In another aspect of the invention, CORBA POA instances are treated as endpoints, and the POA is a unit of object migration. The fully qualified POA name is used as part of the endpoint identifier. Policy objects associated with the POA instance affect what transports and ORB services it supports, and the information needed by a client to use these transports and ORB services is then advertised in the "prototype" object reference generated for that POA and exchanged with the locator.

In one embodiment, the present invention comprises a prototype object reference for use in a distributed object computing environment comprising a specified object reference portion and an unspecified object reference portion wherein the prototype object reference is transformed into a valid object reference by insertion of specification information into the unspecified object reference portion.

The prototype object reference need not be parsed in connection with insertion of the specification information.

Another aspect of the invention comprises a method of providing an object reference, comprising the steps of a first entity generating a prototype object reference, and providing the prototype object reference to another entity. In a preferred embodiment, the prototype object reference comprises information for communicating with the first entity. In a further aspect of the present invention, the second entity generates a second prototype object reference, and provides the second prototype object reference to the first entity. In a preferred embodiment, the second prototype object reference comprises information for communicating with the second entity.

In a further aspect of the present invention, a first entity generates a direct prototype object reference having a specified object reference portion specific to a collection of objects, the direct prototype object reference is provided to a second entity, and object identifier information sufficient to identify an object of the collection of objects is inserted into the direct prototype object reference.

In a preferred embodiment, the invention comprises a location information repository, comprising an identifier of a collection of one or more objects, information of a prototype object reference associated with the identifier, the prototype object reference being configured to receive information of an object identifier specific to at least one of the objects.

Another aspect of the invention comprises a system for facilitating object migration in a distributed object computing environment, comprising an endpoint identity to location identity mapping; a location identity to process name mapping; wherein the endpoint identity to location identity mapping is independent of the location identity to process name mapping. In a preferred embodiment, the system further comprises a process name to process activator mapping. The system may include selection of a process activator from a plurality of process activators corresponding to a process name is determined by a criterion. The criterion may be determined at run-time. The system also permits a plurality of location identities to be mapped to a single process name. The system may be further configured to comprise a process name to process mapping, and in such a system a single process name may be mapped to a plurality of processes. Selection of a process from a plurality of processes corresponding to a process name may determined by a criterion, and the criterion may be determined at run-time.

In another aspect, the invention comprises establishing policies for endpoints of an object request broker system, storing policy information associated with a non-terminal of an endpoint naming hierarchy; applying the policy information to all descendants of the non-terminal.

DESCRIPTION OF THE FIGURES

FIG. 6 shows an example entry in a preferred IMR dynamic process activator information table.

FIG. 7 describes the fields of an IMR static process information table entry.

FIG. 8 describes valid values of the start-up flags field of the IMR static process information table entry described in FIG. 7.

FIG. 9 describes the fields of an activator specification list entry from an entry in the IMR static process information table described in FIG. 7.

FIG. 10 shows an example of a preferred IMR dynamic process information table entry.

FIG. 11 describes values for the state field of the target process dynamic entry shown in FIG. 10.

FIG. 12 describes an example of a preferred IMR static namespace table entry

FIG. 13 describes an example preferred IMR static POA endpoint table entry.

FIG. 14 describes values for the state field of the POA endpoint dynamic IMR entry described in FIG. 13.

FIG. 15 describes an example preferred IMR endpoint activator table entry.

FIG. 16 shows an example preferred IMR endpoint activator table entry.

FIG. 17 describes an example preferred IMR ORB to process map table entry.

DETAILED DESCRIPTION

Figure 1:
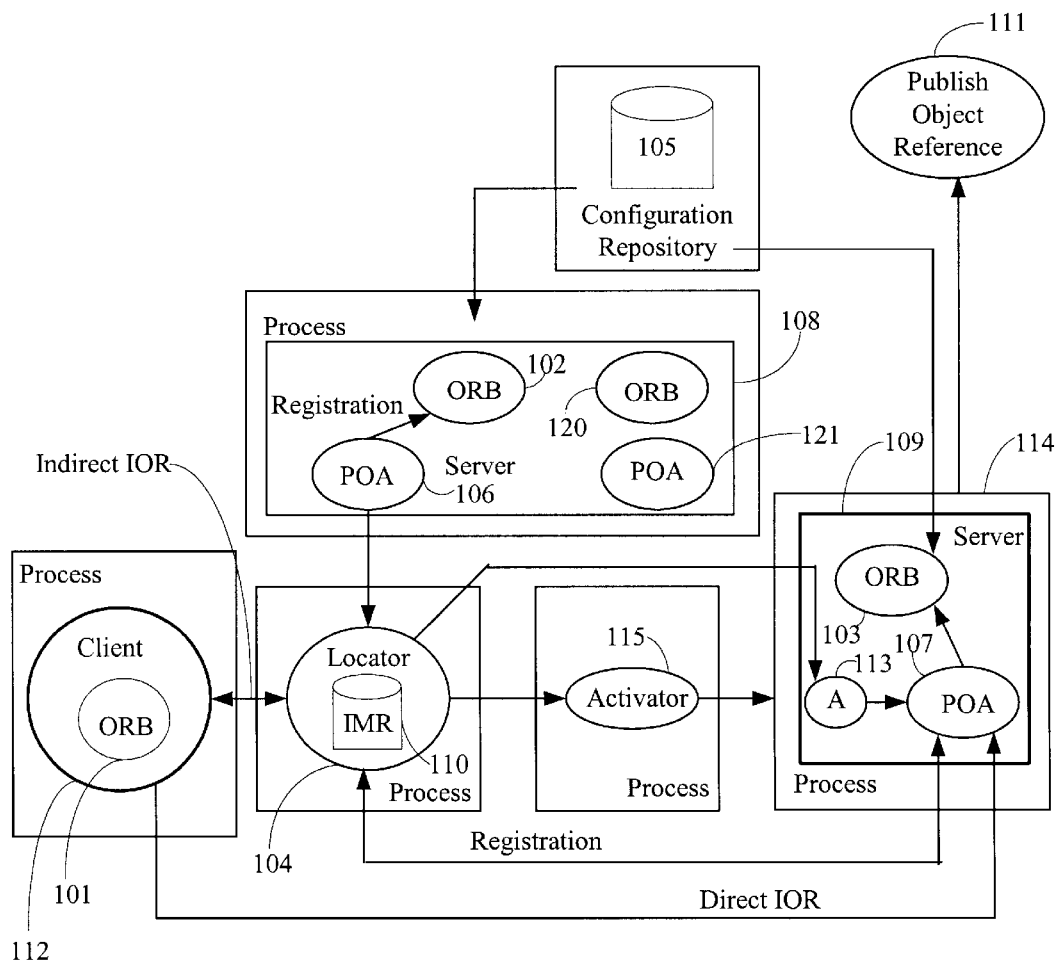
FIG. 1 is a simplified illustration of one way in which a collection of ORBs make use of location service components to forward client requests in establishing a communications channel between a client and the target object.

The invention comprises an improved ORB system including a location service comprising one or more implementation repositories (IMRs), one or more location agents, and zero or more activation agents for managing the location, activation and invocation of objects in a distributed object environment.

The system utilizes CORBA IORs, comprising one or more profiles. An object key is contained in an IOR profile that the client passes as part of a request message to identify the target object of the request, within the context of the communication channel to the target process established based on addressing information in the profile. Such addressing information and other information in the profile that may be used by the client to make invocations on the target object is referred to in this specification as additional profile information (API). In the present system, at least one profile comprises an object key and additional profile information (API).

The structure or schema and operation of the IMR are designed to provide durable IORs for objects in collections which may migrate or undergo changes in services which would affect the API or other profiles of conventional IORs referencing those objects. Such collections of objects are referred to as endpoints. While an endpoint may include only a single object, to facilitate scaling to large numbers of target objects, ORB clients in the system may communicate with endpoints and endpoints may handle communications with objects within an endpoint.

The object key of the system further comprises an endpoint identifier portion, and an object identifier portion. The endpoint identifier portion of the object key does not vary among target objects that are part of the same target endpoint. An endpoint is simply a collection of one or more objects referenced using a particular endpoint identifier. The object identifier portion of the object key identifies an individual object within an endpoint.

The system uses IORs of two types to provide a location service. A direct IOR comprises an object key and transient API sufficient to allow the client to communicate with the current location of the target object's endpoint. An indirect IOR comprises an object key and persistent API that enables a client to communicate with a location agent. An indirect IOR is a durable reference to the object, and remains valid and may successfully be used to invoke an object even when the object's endpoint has migrated to a different host or process or ORB than where the object resided at the time the indirect IOR was created, the services utilized through invoking an object of the endpoint has undergone changes, or the endpoint is inactive at the time of the request.

Multiple levels of indirection may be accommodated by the present system, including firewalls, tunnelling and proxies. The resolution of an indirect IOR by the system may result in another indirect IOR, and this process may be repeated a number of times before a direct IOR is used to invoke the target object. These and other uses will be readily apparent to those of skill in the art.

In a preferred embodiment, the object keys of an indirect IOR and a direct IOR referencing the same target object are substantially the same. In a preferred embodiment, an endpoint comprises a collection of one or more co-located objects having common API.

The system uses prototype IORs which differ from IORs in that a portion of the IOR is unspecified. Such prototype IORs may be transformed into IORs by the inclusion or substitution of appropriate specification information. The specified portion of the prototype IOR may be opaque to the system component performing the inclusion or substitution. The unspecified portions of such prototype IORs may be blank or contain dummy information.

For example, a preferred prototype IOR has an unspecified object identifier, and thus need not comprise an object identifier corresponding to an object within an endpoint. Such a preferred prototype IOR is transformed into an IOR by insertion of an object identifier into the unspecified portion. The system component that inserts the object identifier need only know how to insert the object identifier; no other information about the IOR is required for a valid IOR to be created from the prototype IOR.

Prototype IORs may be prototype indirect IORs or prototype direct IORs. An indirect IOR may be created by inserting an object identifie[00f8] for an object of an endpoint into the endpoint's prototype indirect IOR. Similarly, an direct IOR may be created by inserting an object identifier for an object of an endpoint into the endpoint's prototype direct IOR.

Endpoints can be implemented in various ways but a preferred embodiment uses the CORBA POA interface for portable object adapters POA details are described in Chapter 9 of the CORBA 2.2 specification. POA implementations may differ in their details, and the phrase "POA instance" as used in this specification refers an object having the CORBA POA interface. Other kinds of object adapters and endpoints such as CORBA basic object adapters (BOAs), multicast object adapters (MOAs), database object adapters (DOAs) or custom object adapters may also be used as endpoints in the system.

In a preferred embodiment, a POA instance acts as an endpoint for a collection of one or more objects that reside in a process. A POA can exist for any number of objects, including one object or thousands of objects.

Policy objects used in the creation of a POA instance may affect the API of included IORs for objects for that POA instance. Policies may include such things as an activation policy for a process in which to execute objects of the endpoint. Policies may also include such things as execution priorities, number of threads or threading parameters, security parameters, or any other properties related to the execution of objects in the endpoint. In a preferred embodiment, default values may be supplied for policies. In addition, policies can be set programmatically in the application or configured administratively, or defaulted at the ORB or administrative domain level.

POA endpoints may be used to apply the policies of the endpoint to the member objects of the endpoint. In addition, objects for which co-location is desirable may be advantageously collected into one or more POA endpoints. Servers can have multiple POAs dividing large collections of objects into manageable groups of objects. Preferably, ORBs interact with endpoints rather than individual objects. These interactions are transparent, in that client programs remain unaware of these lower-level interactions. The POA manages communications within the process on the host, and servers interact with the IMR by way of the POA.

In a POA endpoint embodiment, endpoint identifiers preferably comprise the fully qualified POA name (FQPN). In addition, endpoint. identifiers may comprise an object adapter type, domain name, and version information. The FQPN identifies a POA instance with a persistent lifespan and includes the leaf POA name and all its parent POA names. In a preferred embodiment, the FQPN uniquely identifies the endpoint within a location domain.

A preferred embodiment of the ORB system !comprises an ORB core and an assortment of plug-ins that provide functionality such as transports, object adapters, and various ORB services. The ORB core and the various plug-ins may be implemented as shared libraries or dynamically linked libraries or DLLs for loading on demand at run-time. Requests received by a transport plug-in are dispatched through the ORB core to the plug-ins that are responsible for processing the request, including ORB services and an appropriate object adapter. Responsibility for processing of a received request is passed from the ORB core to plug-ins and between plug-ins using server-side interceptor interfaces.

In a preferred embodiment, the ORB system's location agent comprises the ORB core, various transport and ORB service plug-ins, the OA-independent location functionality, and plug-ins that provide OA-specific location functionality. The OA-independent location functionality may also be implemented as a plug-in, and is referred to in this specification as the "locator plug-in". The POA-specific location functionality is provided by the "POA location plug-in", which is responsible for POA-related target endpoint configuration, monitoring, and management. Both the locator plug-in, and OA-specific plug-ins such as the POA location plug-in, include implementations of an interceptor interface in order to receive responsibility for processing requests.

The ORB core maintains a registry for each ORB for mapping complete or partial object keys to server-side interceptors. See the copending application entitled "object request dispatch using matching of a segmented object key" by Robert Kukura, Ronald Witham incorporated herein by reference. At ORB initialization, the location agent plug-in registers itself as an interceptor in the interceptor registry.

Operation of POA Endpoint Example Embodiment

When application servers initialize they register information about their endpoints and/or endpoint activators with location service. FIG. 1 illustrates one way in which a collection of ORBs make use of location service components to forward client requests in establishing a communications channel between a client and the target object. Process can have multiple ORBs.

At startup, server ORBs 102, 103, 120 receive an IOR for the location service or locator 104 from a configuration information repository 105. As part of installation/configuration, one or more endpoints 106, 121, 107 for each server 108, 109 are registered with the IMR 110 via the location agent 104. Each registered endpoint is entered in an IMR static endpoint table as shown for example in FIG. 13, and active endpoints 106, 121 are additionally entered in an IMR dynamic endpoint information table as shown in FIG. 14.

For each of its active endpoints, each server constructs a prototype direct IOR containing API for communicating with the endpoint. Each server provides prototype direct IORs it constructed to the IMR. The location service stores each prototype direct IOR in the IMR dynamic endpoint information table as shown in FIG. 14. The location service also constructs a prototype indirect IOR containing API for communicating with one or more location agent and passes the prototype indirect IOR back to each active endpoint. In addition, a POA location endpoint interceptor for each active endpoint is registered in the location agent's interceptor registry for the location agent using the endpoint identifier for the active endpoint.

The servers need not have knowledge needed to construct IORs for the location service, and the location service need not have knowledge needed to construct IORs for the endpoints. The prototype indirect IOR is generated by the location service in part because each target endpoint may support different transport protocols, ;security mechanisms, and the like. A location service may support a superset or subset of all transport protocols, security mechanisms, etc. required by target endpoints in a location domain. When a location service generates an endpoint-specific prototype indirect IOR, it includes the endpoint identifier of the target endpoint and API of one or more location agents. This provides more flexibility for clients of the location service. For example, a client may communicate with a location agent via a different transport protocol than a protocol used to communicate with a target endpoint itself.

Referring again to FIG. 1, servers 108, 109. create indirect IORs for their objects by inserting an object identifier for each object into the prototype indirect IOR for the corresponding POA endpoints 106, 107 passed back to them by the location service 104. The servers provide the indirect IORs to clients by, for example, publishing them 111 via some means such as a name service, URL, or perhaps some email or event message.

Active Endpoint Example

When a client application 112 uses a published indirect IOR for an active endpoint, the client ORB 101 passes a message containing the object key to a location agent 104 referenced in the IOR. The location agent's ORB performs a "best match" lookup using the received object key and dispatches the request to the POA endpoint interceptor registered in the interceptor registry with the endpoint identifier portion of the object key.

The endpoint interceptor retrieves the prototype direct IOR for the endpoint from dynamic endpoint information, extracts the object identifier from the object key sent by the client ORB 101, and inserts that object identifier into the prototype direct IOR, creating a new direct IOR. The new direct IOR is then passed back to the client ORB 101 in a "forward" response.

The client ORB 101 then uses the direct IOR received from the location agent to communicate with the server object by way of the object's POA endpoint 107. The client ORB 101 continues to use the direct IOR for subsequent requests until the direct IOR becomes invalid, for example because the endpoint 107 migrates or is deactivated or a communication failure occurs.

Inactive Endpoint Example

If the target POA endpoint 107 is inactive when the location agent 104 receives a request from client ORB 101, the IMR typically will contain no dynamic endpoint information table entry for the endpoint referenced in the indirect IOR received from the client ORB. Since the endpoint is inactive, the best match of the received object key results in the request being dispatched to the POA location interceptor rather than the POA location endpoint interceptor. The POA location interceptor was previously registered by the POA location plug-in when it was initialized in the location service. The POA location interceptor retrieves the IMR static POA information table entry for the POA endpoint 107. An example IMR static POA information table entry is shown in FIG. 13.

In a preferred embodiment, an ORB name is used as a location identifier. Using the ORB name from the IMR static POA information table entry for the POA endpoint 107, the location agent looks up the endpoint activator in the IMR endpoint activator table. An example IMR endpoint activator table entry is shown in FIG. 16.

The presence of an IMR endpoint activator table entry implies that the process 114 is running and an endpoint activator 113 is present. Using the endpoint activator IOR from the table entry, the location service 104 sends a request to the endpoint activator 113 asking that the POA endpoint 107 be activated.

When the POA endpoint 107 is activated by the endpoint activator, it registers a prototype direct IOR with the location service 104 as described above, and the location agent uses the prototype direct IOR and the object key received from the client ORB to forward a direct IOR to the client ORB 101 for the object in the now: activated POA endpoint.

Process activation example

If no IMR endpoint activator table entry is found for an inactive endpoint, the POA location interceptor checks to see if the process for the endpoint is running. Using the ORB name from the IMR static POA information table entry for the POA endpoint 107, the location agent looks up the target process name in the IMR ORB-to-process information table. If no entry is found, a CORBA::TRANSIENT exception is returned to the client ORB 101. An example IMR ORB-to-process information table entry is shown in FIG. 17. If an entry is found, using the target process name, the location agent checks for an entry for the process in the IMR dynamic process information table. An example IMR dynamic process information table entry is shown in FIG. 10. If a dynamic process information table entry is found, the request is queued pending registration of an endpoint or endpoint activator. Upon registration of an endpoint or endpoint activator, the request is processed as described above.

If no dynamic process information table entry for the target process is found in the IMR by the location agent, the location agent looks up the target process name in the IMR static process information table. An example IMR static process information table entry is shown in FIG. 7. If no entry is found, a CORBA::TRANSIENT error is returned to the client ORB 101. If an entry is found, the location agent selects an activator from the activator list and attempts to start the target process on the corresponding host. Multiple activators may be listed in the activator list, and the location agent will select activators from the activator list based on criteria which may be dynamically loaded. Criteria for selection of activators may include, for example, availability, load balancing, fault tolerance, proximity to client, cost, security, replication, among others.

The location agent 104 uses the activator name selected from the activator list of the IMR static process information table entry to look up the activator in the IMR dynamic process activator information table. An example entry in the IMR dynamic process activator information table is shown in FIG. 6. The IMR dynamic process activator information table entry for the activator includes an IOR for a process activator 115 residing on a target host. Using the IOR and other information from the activator information table entry, the location agent 104 sends a request to the process activator to activate the target process 114. When the target process is activated, the server startup process and endpoint or endpoint activator registration occurs as described above, resulting in the delivery of the direct IOR to the client ORB.

Endpoint Activators

Although an endpoint activator could be implemented for each endpoint, or for each POA, or for each server, in a preferred embodiment, no endpoint activator instance 113 need be created or registered until activation of at least one POA having a POA adapter activator in the POA hierarchy associated with the ORB 103. When such a POA with an adapter activator is announced, the endpoint activator 113 for the ORB :103 is registered in the IMR endpoint activator table. An example IMR endpoint activator table entry is described in FIG. 16.

In a preferred embodiment, there is at most one endpoint activator per ORB name. The endpoint activator for an ORB provides a single point for requests to activate endpoints associated with the ORB, although in a preferred POA endpoint embodiment the activation of particular POA endpoints is delegated by the endpoint activator to a POA adapter activator of a POA parent to the target endpoint.

When a POA endpoint activator such as 113 receives a request containing an FQPN endpoint identifier, the endpoint activator traverses the POA hierarchy ancestral to the target endpoint until it finds the POA adapter activator of a POA closest to the target POA. The endpoint activator then requests the POA adaptor activator to activate the next child POA in the FQPN. This process is iterated until the target endpoint is activated. If no such POA adapter activator exists, or if that adapter activator returns a "NO CHILD" exception, an "OBJECT NOT EXIST" exception is returned to the client ORB.

The Location Domain

The combination of a centralized location agent and IMR allows endpoints to migrate across processes, hosts, ORBs and even administrative domains. Objects can move when their server stops and restarts or when the server is moved to a different host. When these servers restart in a new process or on a new host, they re-register, supplying new endpoint locations of to the IMR. In addition, service changes that require changes to the API of direct IORs for objects in the location domain may be made without affecting existing indirect IORs. Servers need not re-publish indirect IORs for objects in their endpoints because any pre-existing object references for these objects will still be valid so long as the location domain has not changed. The location agent will resolve the IORs to the newly registered locations in the IMR.

Figure 2:
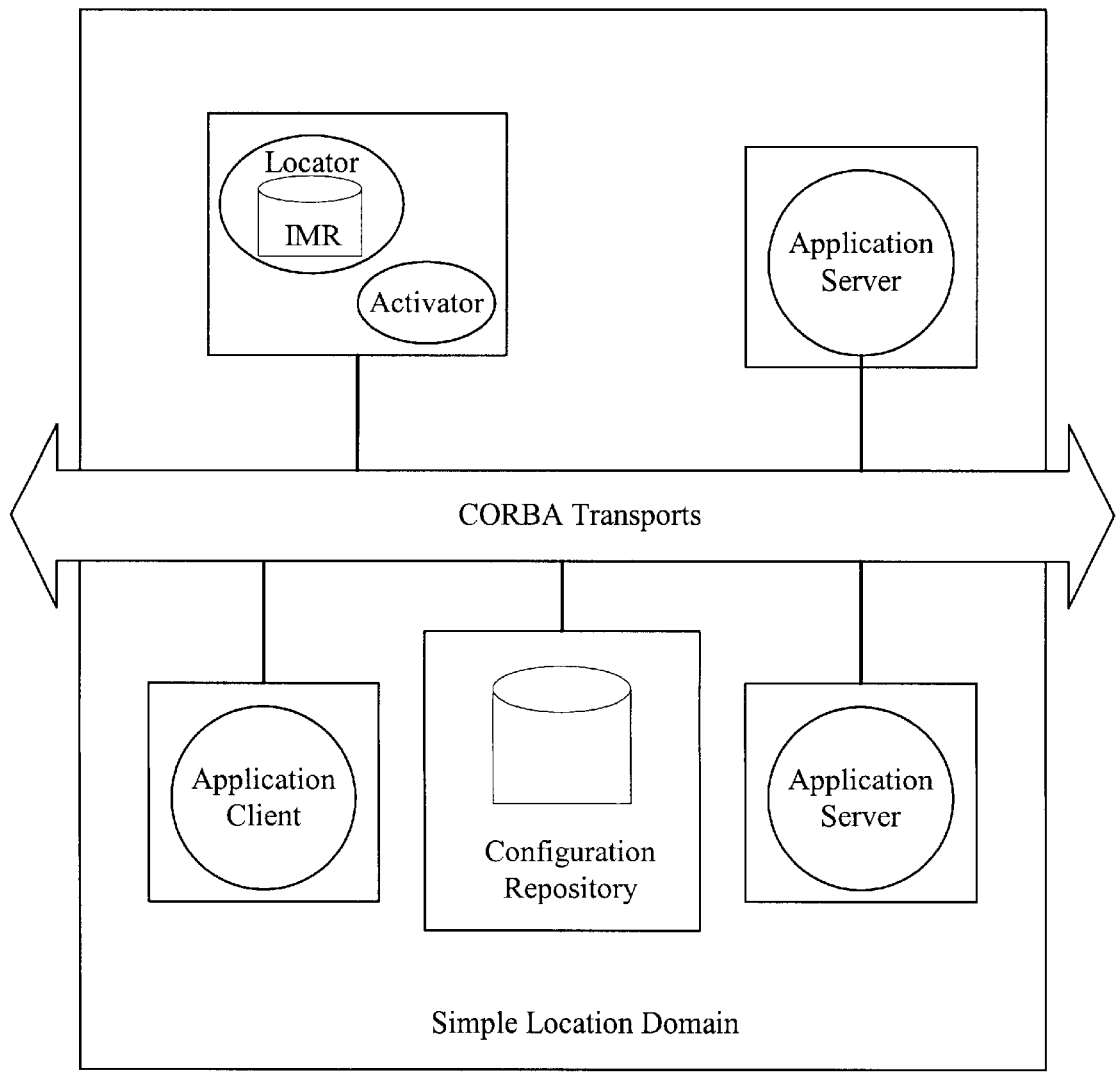
FIG. 2 illustrates a location domain that coincides with an administrative domain.
Figure 3:
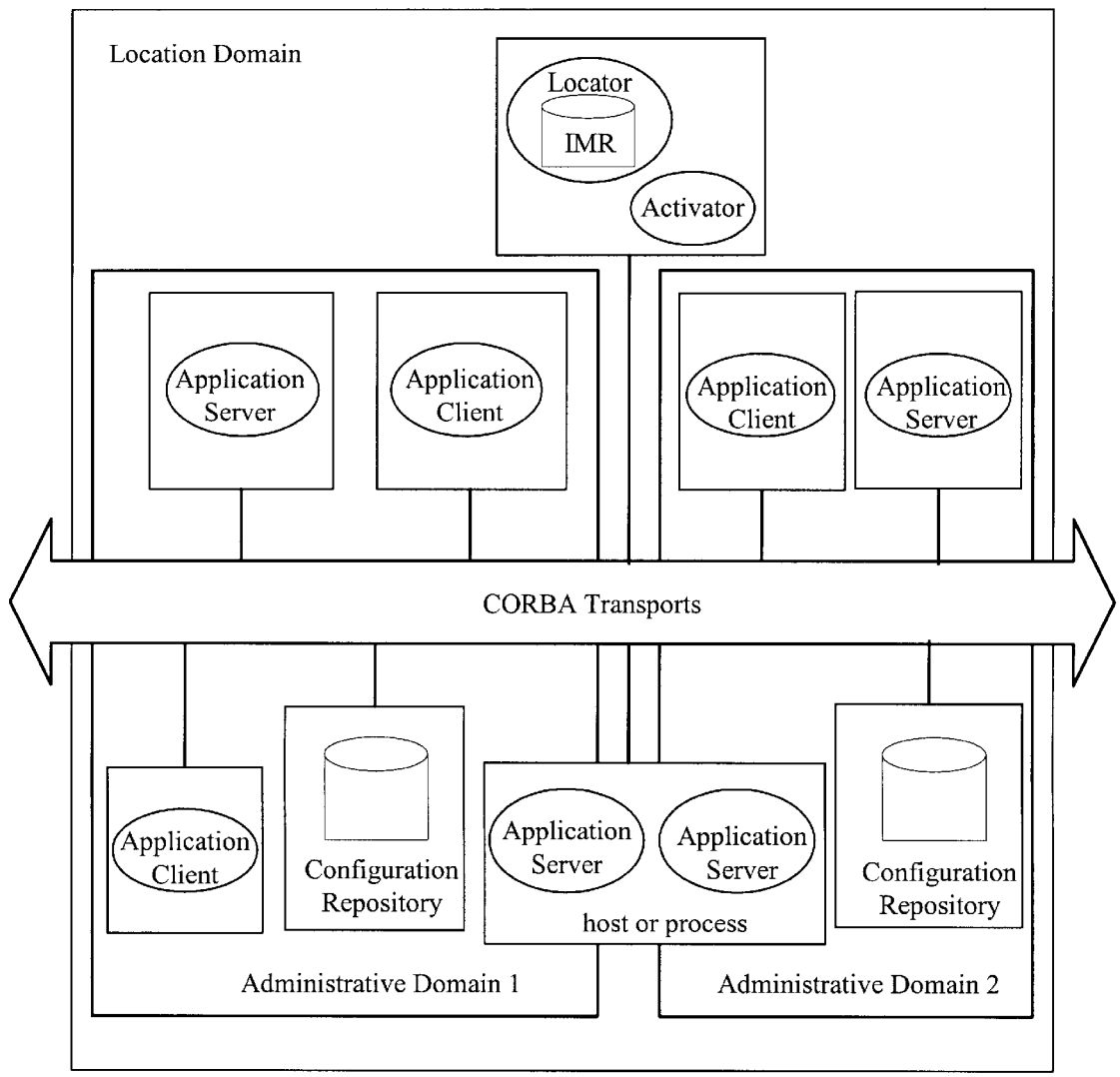
FIG. 3 shows a location domain in which ORBs in separate administrative domains share a location domain.

The location domain may coincide with an administrative domain as shown in FIG. 2, but need not. A location domain can contain multiple administrative domains. FIG. 3 shows a location domain in which ORBs in separate administrative domains share a location domain.

Figure 4:
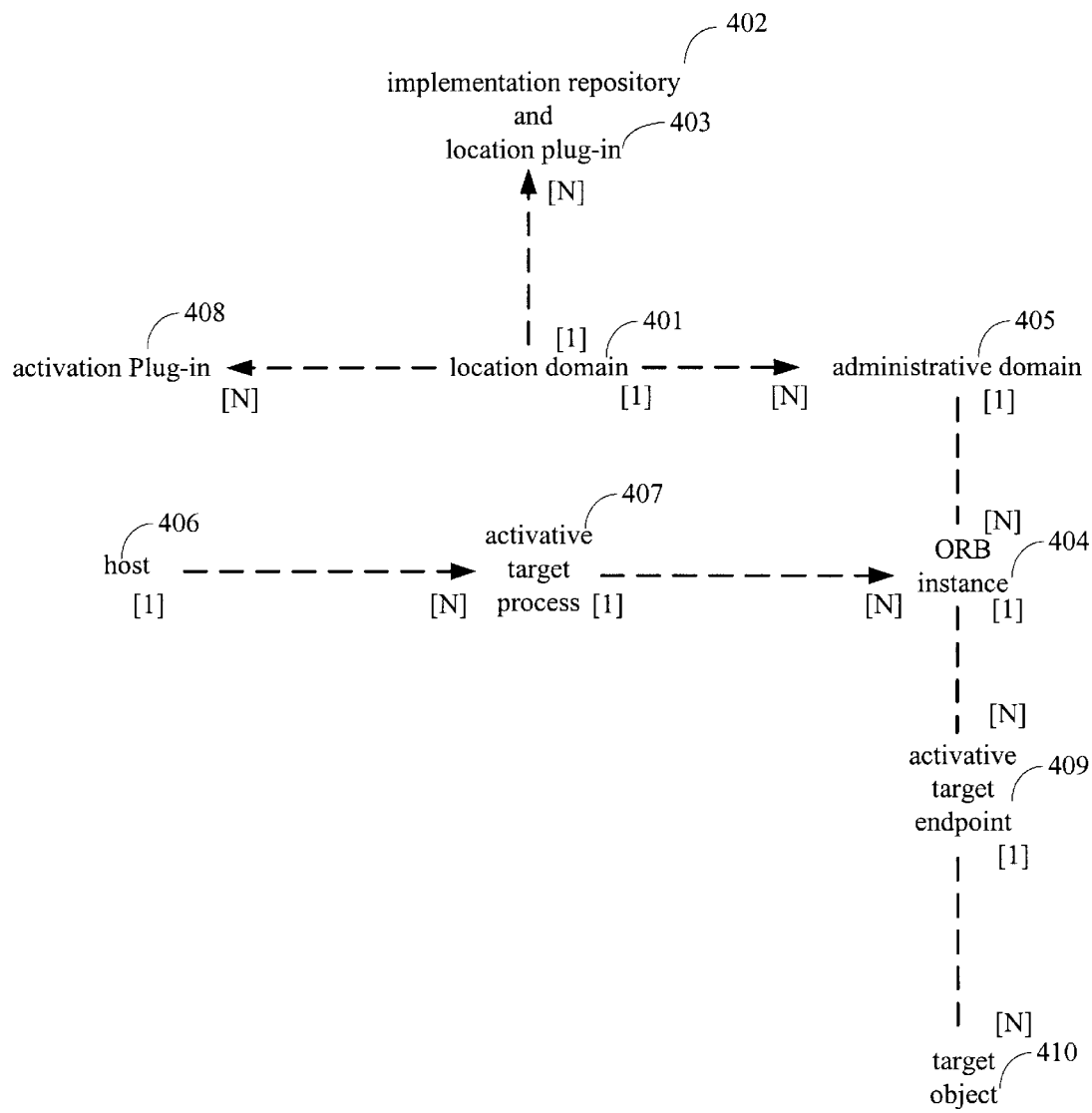
FIG. 4 diagrammatically illustrates the typical relationships between the entities in a preferred embodiment.
Figure 5:
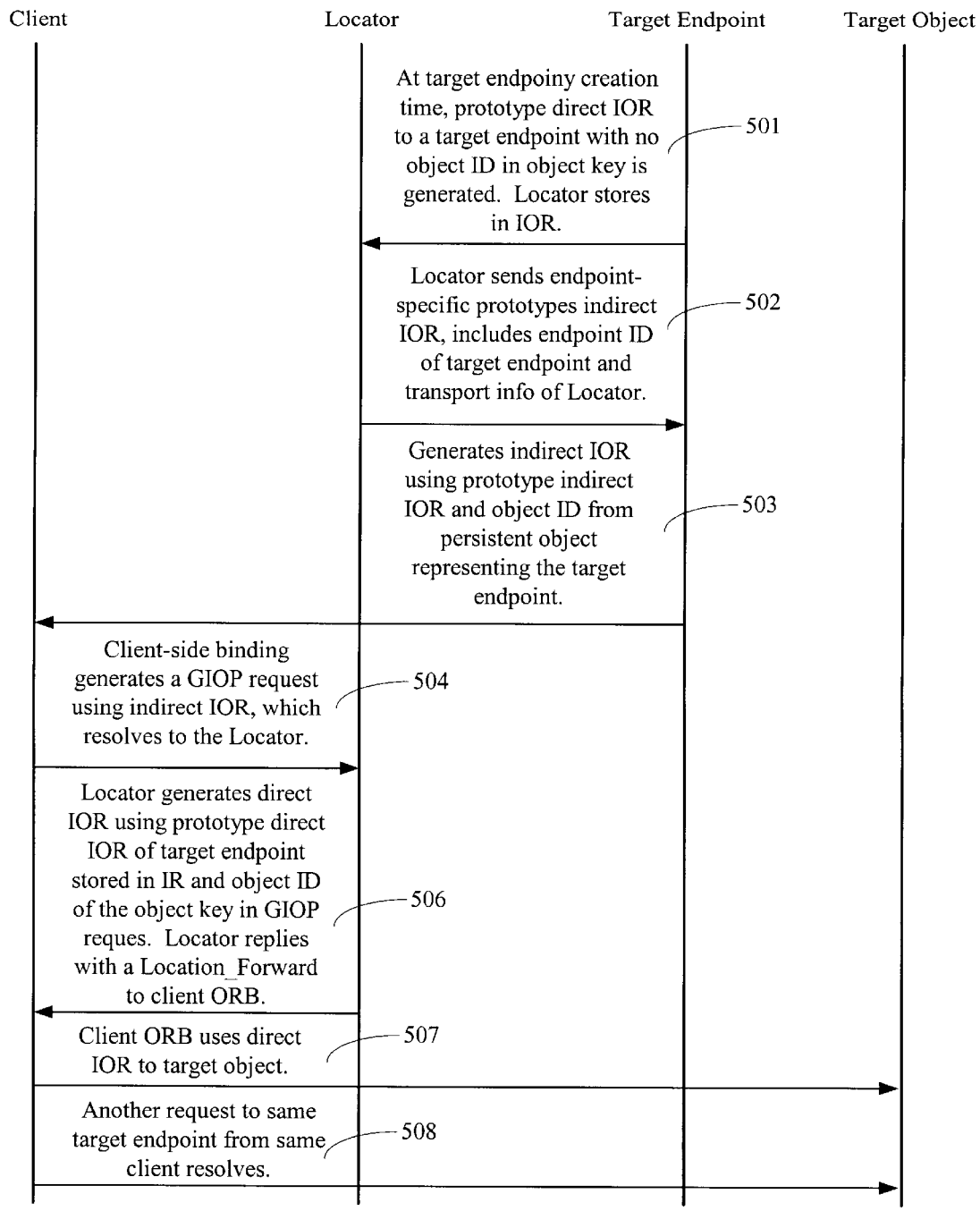
FIG. 5 diagrammatically illustrates one way that clients and servers use prototype IORs and the location service to establish communication with each other.

FIG. 4 diagrammatically illustrates the typical relationships between the entities in a preferred embodiment. A location domain comprises a set of ORB instances 404 within which endpoints may migrate without affecting the validity of existing indirect IORs. Location service within a location domain is provided by one or more IMRs in conjunction with one or more location agents 403. The location domain may potentially span one or more administrative domains 405, hosts 406, and target processes 407. And one or more process activators 408 may be configured within a location domain. Location domains may be federated into larger location domains, and a single process may contain ORBs from more than one location domain.

FIG. 4 includes two horizontal views. The first spans location domain 401 to administrative domain 405, and then to ORB instance 404. The second spans host 406 to active target process 407 to ORB instance 404. One or more (i.e. some number N) ORB instances 404 may be initialized in one administrative domain 405 spanning one or more hosts 406 and target processes 407. One or more target endpoints 409 may be active in one ORB instance 404. And one or more target objects 410 may exist for one active target endpoint 409.

Client programs using the present invention are not required to explicitly find persistent objects. They merely invoke an operation request using an object reference. A location agent resolves the first operation request from a client to a particular target endpoint. The location agent generally need not be involved with subsequent requests unless the target process has stopped running, the target endpoint becomes inactive, or the target process/target endpoint has moved due to transparent reactivation.

As described in more detail above with respect to the example depicted in FIG. 1, the location agent is responsible for managing an implementation repository (IMR), locating a target process/target endpoint within the IMR, communicating with a process activator for target process activation if necessary, and communicating with an endpoint activator for target endpoint activation if necessary. In a preferred embodiment, the location agent is responsible for target process and target endpoint activation but is not responsible for target endpoint or target object existence. The location service will not create new objects but will simply reactivate existing ones. The activator is only responsible for activating a target process and has no persistent data to manage.

Implementation Repository

The IMR is used to register and store static data describing server processes and endpoint specific information needed by the location service to determine the correct server process for handling incoming location requests. The data in the IMR identifies such things as the executable file to use for a particular server process: and the host to run it on, the command line switches to pass to the executable on process startup, the environment variables that need to be set and start flags indicating how and when server processes should be started. An IMR comprises an OA-independent portion, which contains information about server processes and ORB instances, and an OA-specific portion that is used to map an incoming location request to the proper server process.

A location agent may manage more than one:IMR instance. An IMR registry may be used to manage associated IMR instances for a given location agent. A management interface may be provided to query, create, delete, move, rename, enable, and disable an IMR in the IMR registry. In addition, a given IMR instance may have, one or more endpoint specific repositories with which it is associated. These repositories manage the information used by that endpoint's location agent to map an incoming location requests to the appropriate server processes, ORB and endpoint. The IMR uses an OA repository registry to manage multiple OA specific registries.

In a preferred embodiment, IMR information is stored in non-volatile storage such as a disk, and may be stored in any of a variety of logical structures including for example a relational, object-relational or object oriented database, one or more files, a distributed file system, or the like.

Implementation Repository Entries

The IMR comprises entries at target process, ORB and target endpoint granularity. Target processes can support multiple target endpoints and, multiple transports. In addition, the IMR comprises static and dynamic information about both target processes and target endpoints. Static entries typically comprise configuration information entered or updated with the use of a management or configuration tool (although such entries may on occasion be made or updated dynamically). Dynamic entries typically comprise system state information entered or updated by the system during operation. These static and dynamic IMR entries are preferably in permanent storage.

Static information defines target processes and target endpoints. It also associates target endpoints with their currently configured target processes. These entries may be modified by any security identity that has the proper access rights. Dynamic information is used to monitor running target processes and active target endpoints. These entries are typically created and modified by the location service, but other security identities that have the proper access rights may be allowed to read and delete them. Access may be controlled using information associated with individual entries, providing a hierarchical access control model when the entries are hierarchical.

Simple implementations include one dynamic IMR entry for one static IMR entry. Additional dynamic entries for a given static entry may be added for reasons such as load balancing or replication. If more than one dynamic IMR entry exists for a static IMR entry, one or more dynamic entries may be selected in response to an IOR received from a client ORB based on one or more criteria. The criteria may be determined at runtime.

The location service typically supports target processes and target endpoints that have static entries in the IMR. However, a location service may be configured to implicitly create target processes and/or endpoints and add corresponding static entries in response to requests referencing processes or endpoints without static entries.

Target process information described in the .IMR is typically OA independent. Target endpoint information described in the IMR is typically specific to the OA implementation. Various target OA implementations may require different information to be stored in the IMR. For instance, the target OAs may be POAs or BOAs from different vendors, or customer implemented OAs. Static and dynamic information may differ dramatically among different OA implementations. Since the IMR is defined in terms of OMG IDL, the target endpoint IMR interfaces may be implemented as DLLs or shared library plug-ins to accommodate other OA implementations in a manner similar to the POA location plug-in.

A management interface is preferably provided to query, add, change, remove individual IMR entries. Clients of the location service may perform IMR inquiries or modifications based on IORs or names.

Names in the IMR are preferably hierarchical. A target process name identifies one or more target process instance and is unique among all target process names within an IMR and/or location domain. In addition, a target endpoint name for a persistent POA comprises a fully-qualified POA name (FQPN) and is unique within an IMR and/or location domain.

A preferred IMR schema is independent of transport or ORB service dependent configurables like ports, protocols, and data encoders. Transports and security mechanisms are preferably implemented as plug-ins, and exposing these configurables in the IMR may conflict with the underlying plug-ins statically and/or dynamically linked in a target process.

The tables of FIGS. 6–17 describe entries in the IMR of a preferred embodiment employing persistent POA endpoints.

The table of FIG. 6 describes the fields of an IMR dynamic process activation table entry. The dynamic process activation table provides the location service with IORs for process activators used to start or restart processes. The process activator name of these entries maps to the process activator names in activator specification list entries shown in FIG. 9.

The table of FIG. 7 describes the fields of an IMR static process information table entry. This table supports administration of data used to define and invoke target processes, and contains static information about registered process activators for starting target processes. The activator specification list contains entries described. in FIG. 9 of information used to start or restart target processes.

The table of FIG. 8 describes valid values of the start-up flags field of the IMR static process information table entry described in FIG. 7,. The flags are mutually exclusive.

The table of FIG. 9 describes the fields of an activator specification list entry from an entry in the IMR static process information table described in FIG. 7. The activator specification list entries support the invocation of a process activator resident on a host to start or restart target processes, and include information such as pathnames for target programs to execute, environment variables and user and group identifiers for the process to run under.

The table of FIG. 10 describes the fields of a dynamic IMR entry for a running process.

The table of FIG. 11 describes values for the state field of the target process dynamic entry shown in FIG. 10. The values are mutually exclusive.

The table of FIG. 12 describes an example preferred IMR static namespace table entry. Namespaces are used to reserve portions of the endpoint naming hierarchy when the naming hierarchy is divided among ORBs. Preferably, every node of the endpoint naming hierarchy has an entry in the IMR corresponding to a namespace or an endpoint. Unlike an endpoint, a namespace may be associated with multiple ORBs and multiple processes. Although not shown in FIG. 12, namespaces may be used to establish policies and/or carry security information applicable to descendants of the namespace.

The table of FIG. 13 describes an example preferred IMR static POA endpoint table entry. These entries are specializations of the namespace table entries described in FIG. 12. These entries support the administration of data needed to define and activate POA target endpoints, and contain static information about POA target endpoints that may run on a host. There need be no activation flags for target endpoints. Target endpoints are preferably activated transparently on demand. The location service implicitly sends a request to an endpoint activator callback object to activate a target endpoint if a client request is made and the target endpoint is not active. For each target process, one or more target endpoints may be registered.

The creation sequence number is generated by the location service when a POA with a persistent lifespan policy is created . In order to provide object identifier uniqueness within a POA, the POA generates object identifiers serially starting at one. However, the sequence is restarted at one when the POA is reactivated. To ensure object identifier uniqueness within a POA through multiple re-creations, an object identifier created by a POA with a persistent lifespan policy comprises information of the creation sequence number from the location service and a sequence number generated from the POA itself.

The table of FIG. 13 describes an IMR dynamic POA endpoint table entry. These entries contain dynamic information about registered target endpoints active on a host.

The table of FIG. 14 describes values for the state field of the POA endpoint dynamic IMR entry described in FIG. 13. These values are mutually exclusive.

The table of FIG. 15 describes an example preferred IMR endpoint activator table entry. The endpoint activator table provides ORB name to, endpoint activator mappings.

The table of FIG. 16 shows an example preferred IMR endpoint activator table entry.

The table of FIG. 17 describes an example preferred IMR ORB to process map table entry.

Interactions Between Location Service and Process Activator

Process activators are used to start up target processes for target endpoints. Each process activator registers with the location service. There may be multiple Activators on a single host. In order to find an appropriate activator to start a target process, the location agent will select an activator from the IMR static process information table entry as shown in FIG. 7, and retrieve the registered process activator information from the activator's IMR dynamic process activator list entry as shown in FIG. 9. The process activator on a host where the target process resides may be used to activate the process.

When the location service gets control and there is an endpoint name match but the associated target process is not activated, the location service checks start-up flags in the static IMR entry for the associated target process. If the start-up flags are not set to "always" or "on demand", an exception, CORBA::TRANSIENT, is returned to the client. Otherwise, the location service creates a target process dynamic IMR entry with a target process state of STARTING and sends a request to an appropriate activator via the registered IOR in the activator list to activate the target process. The activator verifies the security identity of the location agent before running the target process. The activator then starts the target process with credentials specified by locator. Multiple activators running with different credentials may be used to avoid needing to make activator privileged. If the target process is not successfully activated for whatever reason, an exception is sent back to the client. If the target process is activated successfully, the activator waits on the target process, adds an entry to its in-memory table of all actively running target processes and preferably returns state information on the target process to the location service. This allows target processes to be monitored and managed. The location service updates the appropriate dynamic IMR entry and transitions the target process state to RUNNING.

At any point in time, the activator may return information about a target process that stopped running to the location service. The location service deletes the dynamic IMR entries associated with the target process name. For target process transparent restart, the location service then checks the target process's start-up flags. If the start-up flags specify "disable start", then target process restart will not occur. If the start-,up flags specify "on demand", target process restart occurs when a client request arrives for that tar get process.

If the start-up flags specify "always", then the location service attempts to restart the target process immediately. If the start-up flags specify "on demand" or "always" and the target process is not successfully started, an exception, CORBA::TRANSIENT, is returned to the client.

Location Service Administration

When a request is made to add a static IMR entry, the location service validates the endpoint configuration information. The location service then creates a static IMR entry in the implementation repository. The location service extracts credentials information from the * request, includes it in a static IMR entry, and stores the entry. If a request is received to change or delete an existing static IMR entry, the location service validates the owner of the matching IMR entry with the credentials from the change or delete request.

Interactions Between OAs and Location Service

In a preferred embodiment, when a target endpoint is announced to a location service, the location service receives an endpoint identifier, a prototype direct IOR, and a security identity from the target endpoint to identify the endpoint in the IMR. The locator checks for a matching IMR static endpoint table entry, and verifies that received security credentials of server match those stored in the static endpoint table. If no matching static IMR entry is found, an exception is sent back to the callback object.

The location service maintains a table of endpoint activator callback objects for target endpoints in an endpoint activator as shown in FIG. 16. An entry in the endpoint activator list includes an ORB name, the callback object reference, and security information. A target endpoint may be created dynamically if there is an endpoint activator associated with the ORB name in its IMR endpoint static endpoint table entry.

In a preferred embodiment, a target endpoint communicates with the location service in at least the following scenarios:

(1) Announcement of endpoint creation. The location service creates a corresponding dynamic IMR entry for the target endpoint with the new prototype direct IOR and generates and returns a prototype indirect IOR. The location service will create a new POA location endpoint interceptor with the prototype direct IOR for this target endpoint.

(2) Announcement of a POA destroy. The location service deletes the dynamic IMR entries for the target endpoint and all its descendant target endpoints. In addition, the location service removes all corresponding target endpoints interceptors in the interceptor registry. A deactivate operation does not allow a re-creation of its associated POA in the same target process. A destroy operation on a POA may be re-created later in the same target process. From the location service's point of view, the endpoint identifier, which includes the format identifier, location domain and the fully qualified POA name (FQPN), remains unchanged regardless of POA deactivation or destruction.

(3) Announcement of an update of a prototype direct IOR when a new plug-in, for example a new transport, is dynamically loaded or unloaded into a target process. The location service updates the matching dynamic IMR entry for the target endpoint with the new prototype direct IOR and generates and returns prototype indirect IOR. In addition, the location service updates the associated target endpoint's interceptor in the interceptor registry. The target endpoint's Interceptor still gets control, since it is based on the endpoint identifier as a partial object key and which has not changed.

(4) Registration of an endpoint activator when the first adapter activator in a POA hierarchy is created. The location service adds an entry to the endpoint activator table as shown in FIG. 16.

(5) Deregistration of an endpoint activator when the last adapter activator in the POA hierarchy is removed. The location service deletes the endpoint activator from the endpoint activator list.

What is claimed is:

1. A method of providing an object reference, comprising the steps of:

a first entity generating a first prototype object reference comprising information for communicating with the first entity, including a specified object reference portion and an unspecified object reference portion;

providing the first prototype object reference to a second entity:

the second entity generating a second prototype object reference comprising a second specified object reference portion and a second unspecified object reference portion, providing the second prototype object reference to the first entity.

2. The method of claim 1, wherein the second prototype object reference comprises information for communicating with the second entity.

3. The method of claim 2, wherein the first entity is a location service, and the second entity is a server, further comprising the steps of:

the server generating an indirect object reference by inserting an identifier of an object of the server into the first prototype object reference.

4. The method of claim 2, wherein the first entity is a location service, and the second entity is a server, further comprising the steps of:

the location service generating a direct object reference by inserting an identifier of an object of the server into the second prototype object reference.

* * * * *